United States Patent Office 3,769,418
Patented Oct. 30, 1973

3,769,418
ANTIBIOTIC A 28829
Vladimir Prelog, Zurich, Switzerland, Hans Zaehner, Tubingen, Germany, and Hans Bickel, Binningen, Switzerland, assignors to Ciba-Geigy Corporation, Ardsley, N.Y.
Filed Oct. 4, 1966, Ser. No. 584,215
Claims priority, application Switzerland, Oct. 8, 1965, 13,926/65
Int. Cl. H61k 21/00
U.S. Cl. 424—121                                    3 Claims

ABSTRACT OF THE DISCLOSURE

Process (and products produced thereby) for manufacture of a new antibiotic, wherein Streptomyces antibioticus A 28829 is cultivated in an aqueous nutrient solution containing assimilable sources of carbon and nitrogen, as well as inorganic salts, under aerobic conditions until said nutrient solution displays a substantial antibiotic activity. The antibiotic obtained is effective against gram-positive microorganisms and certain fungi.

---

Figure 1:
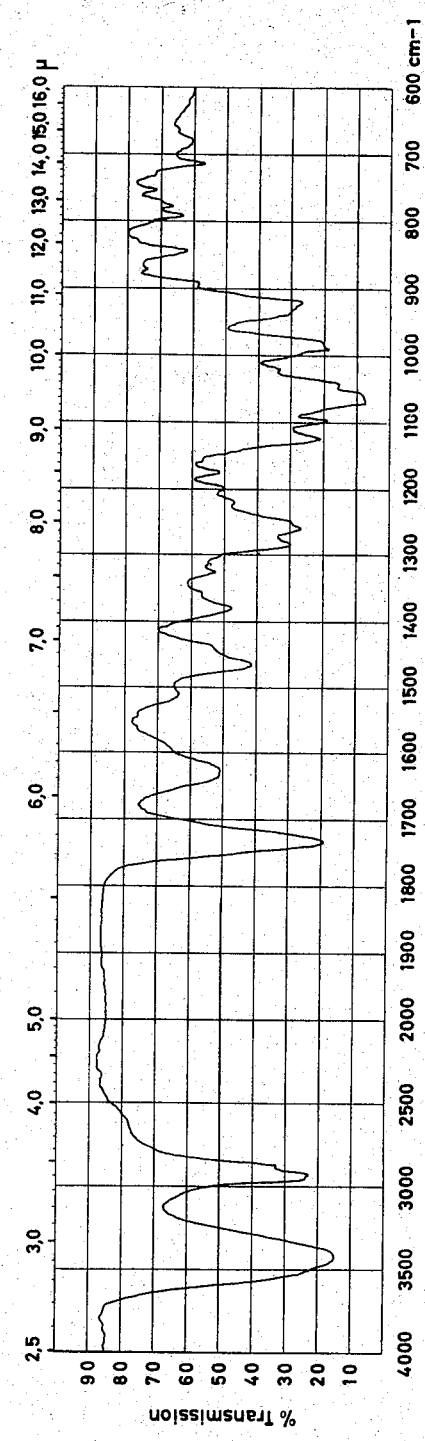

The present invention provides a new antibiotic which is hereinafter referred to as "antibiotic A 28829."

The new antibiotic is formed by cultivating a new strain of the species Streptomyces antibioticus (Waksman et Woodruff), Waksman et Henrici 1948, which was isolated from a soil specimen collected in the surroundings of Bourébo (Béoumi) on the Ivory Coast, and is kept at our laboratories and at the Federal Institute of Technology, Institute for Special Botany, Zurich, under reference number A 28829 and under the number NRRL 3207 at the United States Department of Agriculture, Peoria, Ill.

The new strain Streptomyces antibioticus A 28829 forms a thin, profusely branched substrate mycelium from hyphae 0.6 to 0.8$\mu$ thick, from which air mycellium threads about 1$\mu$ broad emanate and from endogenic spores. The spores are ellipsoid, measure 0.6–1.4 x 0.5–1.2$\mu$ and have a smooth or at most slightly warty surface. The spore chains are monopodially branched and have straight or wavy lateral branches. When the strain is cultivated on a nutrient containing peptone, a melanoid discoloration is observed. The substrate mycelium is light-yellow, yellowish brown to light-brown, brownish grey or dark brown. The air mycelium is velvety, initially chalky white or whitish grey and in the fully ripe state greyish brown to brownish grey or ash grey (cinereus). The strain grows under aerobic conditions at temperatures from 18 to 40, especially from 27 to 37° C. It is sensitive to lysozymes.

For further characterization of the strain its growth on a variety of nutrients is described below. The nutrients Nos. 5, 6, 7 and 10 were prepared according to W. Lindenbein, Arch. Mikrobiol, 17, page 361 (1952); Nos. 2 and 4 according to Pridham et al., Antibiot. Ann. 1956/57, page 947; No. 1 according to Gause et al., "Problems of Classification of Actinomycetes Antagonists" (Russian), Nat. Verlag Medzig, Moscow, 1957, page 22; No. 3 according to Tresner and Danger, J. Bact. 76, page 239 (1958); No. 5 according to the Manual of Methods of Pure Culture Study of Bacteria, Geneva, N.Y., 44–9–10– (1946), pages 54–14; No. 8 according to Ettlinger et al., Arch. Mikrobiol. 31, page 326 (1958); Chromogen agar contains 1 g. of trypton, 1 g. of yeast extract (Difco), 1 g. of meat extract (Lab-Lemco), 8.5 g. of sodium chloride, 17 g. of agar-agar and 1 litre of distilled water).

(1) Mineral substrate: Growth thin, veil-like, light brownish-grey; air mycelium velvety, whitish grey to light grey; substrate not coloured (2) Peptone-iron-agar: Growth wrinkly, whitish yellow, no air mycelium; substrate not coloured (3) Yeast extract-agar: Growth thin, veil-like to wrinkly, brownish grey to dark brown; air mycelium velvety, brownish grey; substrate not coloured (4) Nitrate broth: Annular growth pimply, whitish yellow to light-yellow; air mycelium very sparse, forming a dusty coating, whitish grey; substrate deep yellow to light brown; strong nitrate reduction (5) Glucose-asparagineagar: Growth thin, veil-like, light-yellow to light brown; air mycelium sparse, velvety, whitish yellow to pale carmine or brownish grey; subtrate not coloured (6) Gelatine stab (27° C.): Surface growth punctiform, light brown; air mycelium covered with flour-like coating, whitish grey; substrate dark brown; liquefaction: 1 cm. after 5 days, 5 cm. after 10 days (7) Starch plate: Growth thin, veil-like, light brown; air mycelium covered with flour-like coating to velvety, brown grey; substrate not coloured; hydrolysis: 5 mm. after 10 days (8) Chromogen agar: Growth thin, veil-like, whitish yellow; air mycelium sparse, forming a dusty coating, whitish grey; melanine formation (9) Carvajal's oatmeal agar: Growth thin, veil-like, whitish grey to brownish grey; substrate not coloured; air mycelium velvety, brownish grey

(10) Litmus milk: Annular growth wrinkly, dark brown; air mycelium sparse, forming a dusty coating, whitish grey; substrate dark brown; peptonization, but little coagulation; pH=7.5 after 10 days.

The following carbon sources are used: d-glucose, L-arabinose, saccharose, d-xylose, i-inositol, d-mannitol and d-fructose.

In its essential characteristics the strain 28829 corresponds to Streptomyces antibioticus (Waksman et Woodruff), Waksman et Henrici 1948. In the following Table 1 the characteristic features of strain 28829 and of the type strain Streptomyces antibioticus strain IMRU 3435 are compared:

TABLEAU 1

|  | Strain 28829 | Strain IMRU 3435 |
|---|---|---|
| Morphology of spores. | Spores smooth, ellipsoid. | Spores smooth, ellipsoid. |
| Colour of air mycelium. | Cinereus. | Cinereus. |
| Morphology of air mycelium. | Spore chains monopodially branched straight or wavy. | Spore chains monopodially branched, straight or wavy. |
| Capacity to form melanine. | Present. | Present. |
| Colour of substrate mycelium. | Light-yellow, light-brown, dark brown, brownish grey. | Yellowish brown, light-brown, orangey yellow, greenish grey. |

Antibiotic A 28829 is formed in cultivating Streptomyces antibioticus A 28829 or another strain having substantially the same characteristics. To produce antibiotic A 28829, Streptomyces antibioticus A 28829 or a microorganism that possesses its properties is grown in an aqueous nutrient solution containing a carbon and a nitrogen source as well as inorganic salts under aerobic conditions until the nutrient solution displays a substantial antibiotic activity, whereupon antibiotic A 28829 is isolated from it.

To test micro-organisms for the presence of properties corresponding to those of antibiotic A 28829 the test described below with Botrytis cinerea may be used.

The sources of carbon and nitrogen to be used in the cultivation may be, for example, glucose, saccharose, fructose, starches, mannitol, aminoacids (for example glycine), peptides, proteins and their degradation products such as peptone or tryptone, meat extracts, water-soluble constituents of cereal grains such as maize or wheat, distillers solubles, cornsteep liquor, yeast, seeds (especially of the rape, soybean and cotton plant), ammonium salts and nitrates. Inorganic salts present in the nutrient solution may be, for example, chloride, carbonates, sulphates, nitrates or phosphates of alkali metals or alkaline earth metals, of magnesium, zinc, manganese or iron.

Cultivation is carried out under aerobic conditions, for example in a quiescent surface culture, or preferably submerged with shaking or stirring with air or oxygen in shaking bottles or in the known fermenters. A suitable temperature is within the range from 27 to 37° C. In general, the nutrient solution displays a substantial antibacterial activity after 2 to 5 days. It is of advantage to perform the cultivation in several stages, that is to say at first a pre-culture in a liquid nutrient medium is prepared and then used for inoculating the actual production medium, for example at the ratio of 1:20. The pre-culture may be prepared, for example, by transferring a spore mycelium formed by about 14 days' growth on a solid nutrient medium to a liquid medium and allowing it to grow for 48 hours.

The isolation of the antibiotic from the culture medium, that is to say from the mycelium, follows the usual practice, taking into consideration the chemical, physical and biological properties of the antibiotic. For testing the antibiotic activity in the individual isolation stages—as also in the culture medium—*Botrytis cinerea* is a particularly suitable test organism. The hyphae of this micro-organism are morphologically changed by antibiotic A 28829 (strong branching starting from a certain point so that structures resembling witches' brooms result). The test is performed, for example, as a plate diffusion test in the following manner:

In the centre of the malt agar plates a circular area of 5 mm. diameter is inoculated with *Botrytis cinerea* and the plates are incubated for 2 to 3 days at 24° C., during which the mycelium grows to a diameter of 20 to 30 mm. A solution of the substance to be tested is applied by means of round filter papers of 6 mm. diameter at a distance of about 5 mm. from the edge of the mycelium, whereupon the plates are incubated for 24 to 36 hours at 24° C. In the case of active solutions a morphological change of the hyphae can be observed up to a distance of 24 mm. from the round filter paper. Solutions having a concentration of 30γ/ml. of antibiotic A 28829 still form distinctly changed hyphae.

Antibiotic A 28829 possesses the following chemical and physical properties:

It is a lipophilic, neutral, colourless, crystalline substance which is soluble, interalia, in methanol, ethanol, acetone, ethyl acetate, chloroform, ether and petroleum ether. On crystallization from methanol it forms rodlets melting at 223 to 227° C. with decomposition.

Elementary analysis (percent): C=60.53, 60.79, 60.97; H=8.52, 8.76, 8.32; N=1.89; B=1.35, 1.18; O (calcd.) =27.49.

The molecular weight (determined by the thermoelectric method with methylenechloride as solvent) is ca. 868.

The infrared spectrum (in potassium bromide solution) contains bands, inter alia, at 3420, 2915, 2880, 1735, 1630, 1515 (shoulder), 1165, 1370, 1328, 1287, 1263, 1222, 1202, 1178, 1127, 1100, 1070, 995, 923, 890 (shoulder) 846, 795, 780, 757, 719 cm.$^{-1}$ (see FIG. 1).

Figure 2:
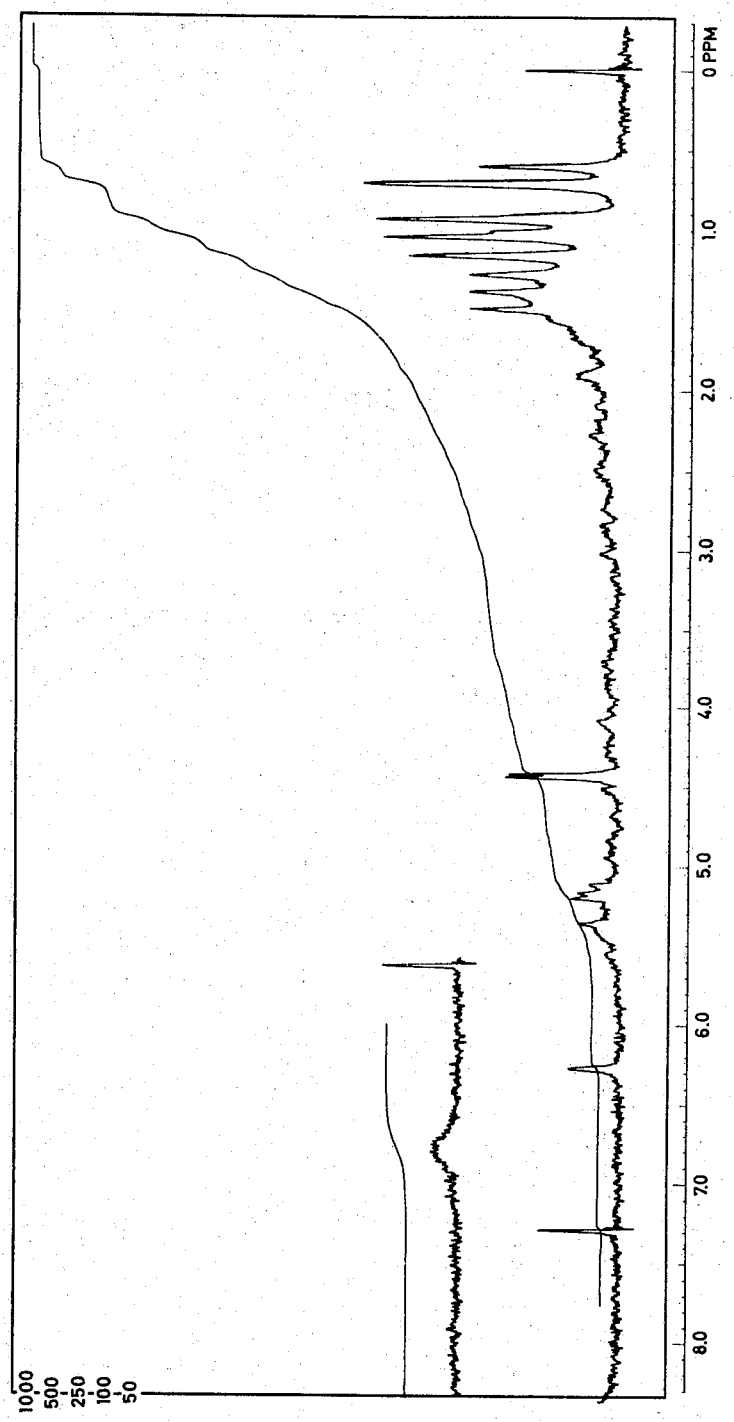

The nuclear magnetic resonance spectrum is shown in FIG. 2.

The ultraviolet absorption spectrum contains no maximum between 210 and 400 m$\mu$.

In the thin-layer chromatogram on silica gel, eluant ethyl acetate, a single spot forms; $R_f$=0.75. Identification by spraying with concentrated sulphuric acid and heating to 140° C. or bioautographically with Spicaria.

When the antibiotic is heated with dilute hydrochloric acid at 100 C. for 30 minutes, no reducing sugar identifiable with ammoniacal silver nitrate or aniline hydrogen phthalate solution is formed.

Antibiotic A 28829 displays a good antibiotic activity towards Gram-positive micro-organisms, for example *Bacillus subtilis,* and towards fungi, for example *Candida vulgaris, Paecilomyces varioti* and *Spicaria.* The following Table 2 shows the various concentrations at which the new antibiotic inhibits thsee micro-organisms in the plate diffusion test (6 mm. round filter papers impregnated with a solution of the antibiotic). The figures given indicate the inhibiting zone for the antibiotic concentration concerned:

TABLE 2

| Micro-organism tested | Zone diameter in mm. at an antibiotic concentration of— | | |
|---|---|---|---|
| | 1 mg./ml. | 0.1 mg./m. | 0.01 mg./ml. |
| Bacillus subtilis (on natural medium) | 22 | 16 | 11 |
| Bacillus subtilis (on synthetic medium) | 33 | 18 | 10 |
| Candida vulgaris | 10 | | |
| Saccharomyces cerevisiae | 10 | | |
| Paecilomyces varioti | 28 | 15 | 9 |
| Spicaria sp | 21 | 18 | 11 |

Further, the new antibiotic is distinguished by its activity against parasitic protozoae especially plasmodiae and piroplasms, such as babesiae, babesiellae and theileriae. It is also active against plasmodiae that have proved to be resistant towards known antimalaria medicaments. The new antibiotic can therefore be used pharmacologically on animals or as medicament, for example for the treatment of malaria, babesiasis, theileriosis, anaplasmosis and other infections. It can also be used as additive to animal fodder. Furthermore, it may be used as a disinfectant or preservative or for combatting plant fungi.

The action against protozoa of the genera plasmodiae and babesiae has been demonstrated in the laboratory as follows:

(1a) Against *Plasmodium berghei*

The action of the antibiotic has been tested in albino mice infected with a normally drug sensitive strain of *P. berghei* as well as in a strain rendered resistant to 7-chloro - 4 - (4 - diethylamino - 1 - methyl - butylamino)-quinoline-diphosphate. Mice are treated once daily orally with a solution of the product on the day of infection and each of the following three days. One day after the end of treatment parasites are counted in a thin blood film. Parasite densities in treated mice are compared in Table 3 with those in untreated control mice. The ED$_{50}$ is that dose which leads to a 50% suppression of parasitaemia in the treated mice as compared with control mice.

TABLE 3

| Dose (mg./kg.) | No. of mice treated | Parasite density (percent of controls) |
|---|---|---|
| Controls | 30 | 100 |
| 1 | 20 | 75±16 |
| 3 | 20 | 42±17 |
| 10 | 20 | 0.03±0.03 |

The ED$_{50}$ is interpolated graphically as 2.2±1.0 mg./kg.

The corresponding ED$_{50}$ for a strain of *P. berghei* resistant to the aforementioned quinoline derivative is ~2±0.6 mg./kg.

(1b) Against *Plasmodium gallinaceum*

A similar test was made in which the avian malaria *P. gallinaceum* was used in infect 50 g.-chicks. In this test the antibiotic was administered twice daily per os as a suspension. Blood films were examined the day after completing treatment. The result is shown in Table 4.

TABLE 4

| Dose, mg./kg./day | No. of chicks infected | Parasite density (percent of controls) |
|---|---|---|
| Controls | 15 | 100 |
| 2 | 10 | 64 |
| 6 | 20 | 86 |
| 20 | 21 | 0.4 |
| 60 | 10 | 0 |

The $ED_{50}$ is interpolated as $7\pm4$ mg./kg.

(1c) Against *Babesia rodhaini*

Albino mice are infected with *B. rodhaini* and the product administered orally in solution as described above for *P. berghei*. The result is shown in Table 5.

TABLE 5

| Dose (mg./kg.) | No. of mice treated | Parasite density (percent of controls) |
|---|---|---|
| Controls | 30 | 100 |
| 1 | 15 | 89 |
| 3 | 15 | 43 |
| 10 | 15 | 0 |

The $ED_{50}$ is interpolated as $2.4\pm1.7$ mg./kg.

The toxicity of the antibiotic has been measured by determining the $LD_{50}$ i.e. the dose that kills 50% of the animals. The $LD_{50}$ of the antibiotic in solution when administered orally to the mouse daily for 4 consecutive days is in the order of 15 mg./kg. The therapeutic index compares favourably with standard drugs which are known to exert a comparable chemotherapeutic action.

In the light of the above tests the antibiotic may be envisaged for the treatment of normal or drug-resistant malaria in man at a daily dose of 2–5 mg. or a fraction of this dose.

Antibiotic A 28829 may be used as a medicament, for example in the form of pharmaceutical preparations containing it in conjunction or admixture with an organic or inorganic pharmaceutical excipient suitable for enteral or parenteral administration. Suitable excipients are substances that do not react with the new compound, for example gelatin, lactose, starches, magnesium stearate, vegetable oils, benzyl alcohols or other known medicinal excipients. The pharmaceutical preparations may be, for example, tablets, dragees, powders or suppositories, or in liquid form solutions, suspensions or emulsions. They may be sterilized and/or they may contain auxiliaries such as preserving, stabilizing, wetting or emulsifying agents. They may also contain further therapeutically useful substances.

The following examples illustrate the invention.

EXAMPLE 1

(a) The strain *Streptomyces antibioticus* A 28829 is cultivated at 28° C. on yeast agar (composition: 4 g. of yeast extract Difco, 10 g. of malt extract Difco, 4 g. of dextrose, 20 g. of Bactoagar Difco, distilled water to make 1 litre). After 14 days a well sporulated mycelium has formed which is suspended in physiological sodium chloride solution. This suspension of the sporulated mycelium (strength: 0.5% by volume) is used to inoculate ½ litre of nutrient solution in a 2-litre conical flask containing per litre of tap water, 20 g. of soybean flour (not defatted) and 20 g. of mannitol. The suspension is incubated for 48 hours at 28° C. while agitating it on round shaking apparatus at 120 revolutions per minute.

(b) 1.5 litres of a pre-culture prepared as described above are used to inoculate 30 litres of a nutrient solution of the same composition as used for making the pre-culture; it is contained in a 50-litre fermenter, and its pH value has been adjusted to 7.8 prior to sterilization (for 20 minutes at 125° C.). While stirring the culture at 700 to 900 revolutions per minute, it is incubated for 72 hours at 28° C. under a superatmospheric pressure of 1 atomsphere (gauge) and while being aerated with 30 litres of air per minute. The mycelium is then removed from the nutrient by vacuum filtration, and the antibiotic A 28829 is isolated from it by the method described below.

(c) A culture incubated as described above under (b) but only for 36 hours may be used for inoculating a larger fermenter (containing 300 litres of nutrient solution) at the volumetric ratio of 1:20, and the resulting culture may then be used for inoculating a fermenter containing 3000 litres of nutrient solution, likewise at the volumetric ratio of 1:20.

(d) 3200 litres of culture medium of pH 6.3 are mixed with 64 kg. of Hyflo-Supercel and filtered. The clear filtrate is discarded. The moist mixture of mycelium and Hyflo-Supercel is stirred for 30 minutes with $2\times 640$ litres of 80% aqueous acetone and then centrifuged. The centrifugate (1650 litres) is cautiously freed from acetone, and the residue (550 litres) is mixed with 82.5 kg. of sodium chloride and extracted at pH 5.9 with ethyl acetate at the volumetric ratio of 3:1 in a countercurrent extractor. The aqueous residue is once more mixed with 82.5 kg. of sodium chloride and extracted in identical manner. The combined extracts (570 litres) are caustiously concentrated to 10 litres. The oily residue is dissolved in 50 litres of petroleum ether (boiling range 50 to 70° C.), and the petroleum ether solution is extracted with $8\times 6$ litres of 85% methanol. The methanolic extracts contain the whole of the antibiotically active substance. On evaporation to dryness there are obtained 640 g. of crude antibiotic A 28829.

EXAMPLE 2

The mycelium obtained as described in Example 1(b) is extracted with $3\times 1$ litre of ethyl acetate, the combined extracts are concentrated to 500 ml., and the concentrate is agitated three times with dilute acetic acid, water, dilute sodium bicarbonate solution and water. The ethyl acetate solution is dried over sodium sulphate and evaporated to dryness under vacuum. According to the test with *Botrytis cinerea* the residue contains substantially all of the activity of the culture medium. 7.09 g. of the residue are subjected to a Craig distribution over 100 stages. The solvent system used for this operation contains per 3 litres of carbon tetrachloride 2.55 litres of methanol and 0.45 litre of water. The substance is flushed with 150 ml. of solvent mixture into the first 3 elements of the fully automatic apparatus. The antibiotic becomes enriched in the stages 10 to 22; these fractions are combined and evaporated to dryness in vacuo, to yield 2.39 g. of a solid, brownish foam which crystallizes extensively when taken up in the ether.

EXAMPLE 3

A solution of 20 g. of the crude antibotic in absolute chloroform is chromatographed on a column of 500 g. of silica gel. The antibiotic is eluted with about 2 litres of ethyl acetate. On concentration to 200 ml., the eluate yields 14.75 g. of colourless crystals. Another 1.95 g. are obtained from the mother liquors.

On recrystallization from methanol the antibiotic melts at 223 to 227° C. with decomposition.

*Elementary analysis* (percent): C=60.53, 60.79, 60.97; H=8.52, 8.76, 8.52; N=1.89; B=1.35, 1.18; O (calcd.)= 27.49.

The molecular weight (measured thermoelectrically with methylenechloride as solvent) is ca. 868.

In the thin-layer chromatogram on silica gel, eluant ethyl acetate, a single spot forms; $R_f=0.75$. Identification by spraying with concentrated sulphuric acid and heating to 140° C. or bioautographically with Spicaria in the following manner:

A filter paper is placed on an agar plate inoculated with Spicaria germs and on top the developed thin-layer plate is placed. After 15 minutes a sufficient of antibiotic has diffused into the agar to cause the growth to be inhibited. The thin-layer plate and the filter paper are removed, and the agar plate is incubated for 20 hours at 36° C.

A solution of 20 mg. of antibiotic A 28829 in 2 ml. of dioxane is mixed with 2 ml. of N-hydrochloric acid and the whole is heated for ½ hour on a boiling water bath. The solution is neutralized with solid barium carbonate, evaporated to dryness and the residue is subjected to paper-chromatographic examination with the eluant n-butanol+glacial acetic acid+water (4:1:1). Reducing sugars can be identified neither with ammoniacal silver nitrate nor with aniline hydrogenphthalate solution.

What is claimed is:

1. Antibiotic A 28829, a lipophilic, neutral, colorless substance, soluble in methanol, ethanol, acetone, ethylacetate, chloroform, ether and petroleum ether, melting at 223–227° C.$_{dec.}$ when crystallized from methanol in rodlet form, having the elementary analysis C=60.76%; H=8.53%; N=1.89%; B=1.27 and O=27.49, having a molecular weight about 868 and whose IR spectrum (in KBr solution) contains bands at 3420, 2915, 2880, 1735, 1630, 1515 (shoulder), 1465, 1370, 1328, 1287, 1263, 1222, 1202, 1178, 1127, 1100, 1070, 995, 923, 890 (shoulder), 846, 795, 780, 757, 719 cm.$^{-1}$.

2. A process for producing antibiotic A 28829 which comprises cultivating *Streptomyces antibioticus* A 28829 NRRL 3207, in an aqueous nutrient medium containing assimilable sources of carbon, nitrogen and inorganic salts, under aerobic conditions until a substantial quantity of said antibiotic is produced in said medium and then isolated from the mycelium.

3. A process as claimed in claim 2, wherein the antibiotic is crystallized from methanol.

No references cited.

JEROME D. GOLDBERG, Primary Examiner

U.S. Cl. X.R.

195—80